US012676967B2

(12) United States Patent
Zhao et al.

(10) Patent No.: US 12,676,967 B2
(45) Date of Patent: Jul. 7, 2026

(54) COMBINED INTRA AND INTER PREDICTION MODE

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/815,654

(22) Filed: Aug. 26, 2024

(65) Prior Publication Data

US 2025/0247526 A1     Jul. 31, 2025

Related U.S. Application Data

(60) Provisional application No. 63/625,705, filed on Jan. 26, 2024.

(51) Int. Cl.
| | |
|---|---|
| *H04N 19/107* | (2014.01) |
| *H04N 19/109* | (2014.01) |
| *H04N 19/11* | (2014.01) |
| *H04N 19/132* | (2014.01) |
| *H04N 19/159* | (2014.01) |
| *H04N 19/176* | (2014.01) |
| *H04N 19/593* | (2014.01) |

(52) U.S. Cl.
CPC ......... *H04N 19/107* (2014.11); *H04N 19/109* (2014.11); *H04N 19/11* (2014.11); *H04N 19/132* (2014.11); *H04N 19/159* (2014.11); *H04N 19/176* (2014.11); *H04N 19/593* (2014.11)

(58) Field of Classification Search
CPC .... H04N 19/107; H04N 19/109; H04N 19/11; H04N 19/132; H04N 19/159; H04N 19/176; H04N 19/593
See application file for complete search history.

(56) References Cited

U.S. PATENT DOCUMENTS

| | | | |
|---|---|---|---|
| 2024/0195952 A1* | 6/2024 | Deng | ............... H04N 19/103 |
| 2025/0227222 A1* | 7/2025 | Naser | ............... H04N 19/593 |

* cited by examiner

*Primary Examiner* — Hesham K Abouzahra
(74) *Attorney, Agent, or Firm* — Morgan, Lewis & Bockius LLP

(57) ABSTRACT

An example method of video decoding includes receiving a video bitstream comprising a plurality of blocks including a first block that is encoded using a combined intra inter prediction (CIP) mode. The method also includes identifying an intra prediction mode for the first block, and identifying an inter prediction mode for the first block, the identified inter prediction mode being one of a geometric partition-based inter prediction mode, an affine motion based inter prediction mode, and a temporal interpolation prediction mode. The method further includes decoding the first block using a combination of predictions from the identified intra prediction mode and the identified inter prediction mode.

19 Claims, 9 Drawing Sheets

┌─ 600

602 Receive a video bitstream comprising a plurality of blocks including a first block. The first block is encoded using a combined intra inter prediction (CIIP) mode 604 Identify an intra prediction mode for the first block 606 Identify an inter prediction mode for the first block, the identified inter prediction mode being one of: a geometric partition-based inter prediction mode, an affine motion based inter prediction mode, and a temporal interpolation prediction mode 608 Decode the first block using the identified intra prediction mode and the identified inter prediction mode Communication System 100

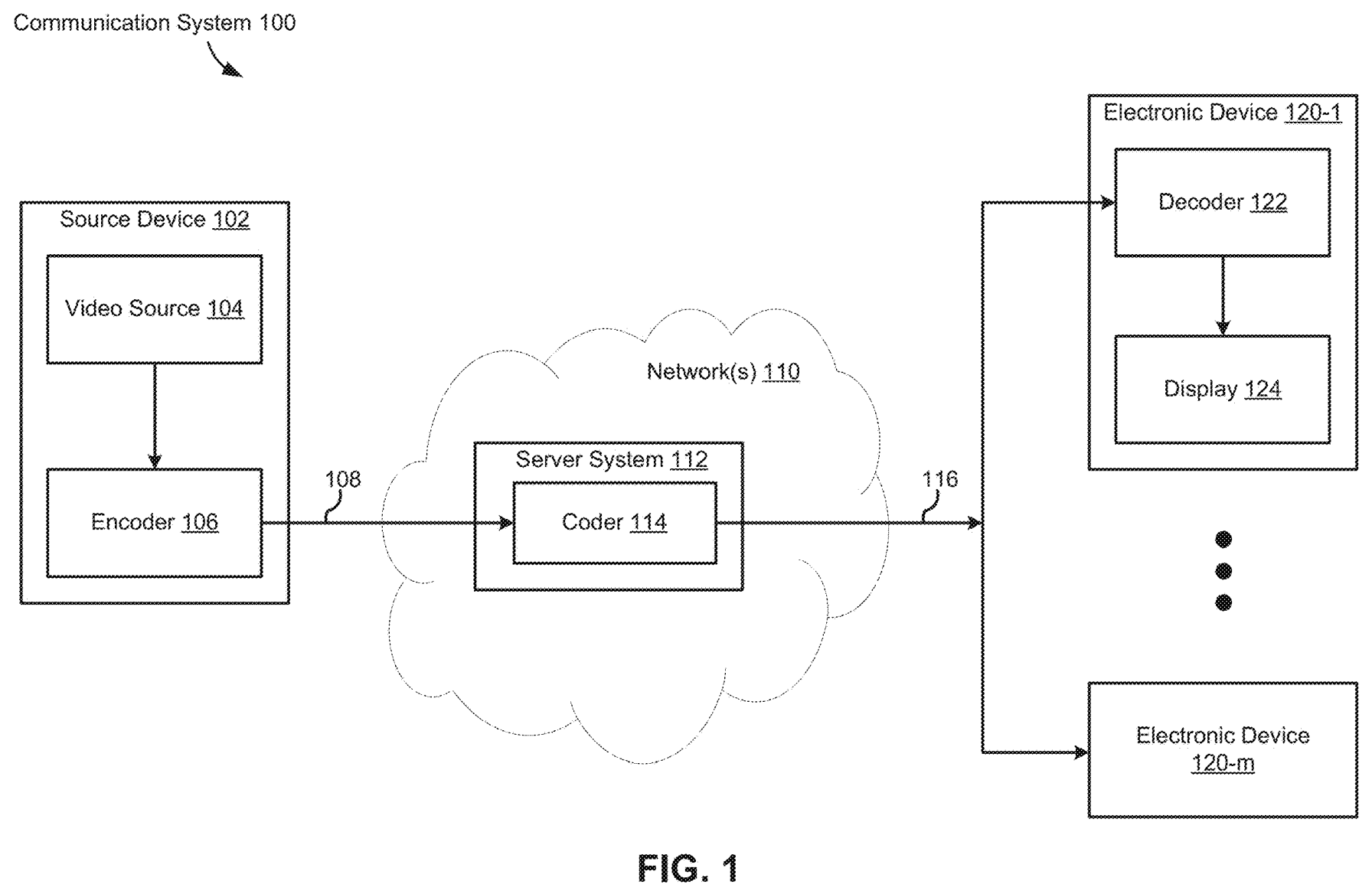

Electronic Device 120-1

Decoder 122

Display 124

Electronic Device 120-m

116

Network(s) 110

Server System 112

Coder 114

108

Source Device 102

Video Source 104

Encoder 106

FIG. 1

Blending matrix $W_0'$                    Blending matrix $W_3'$

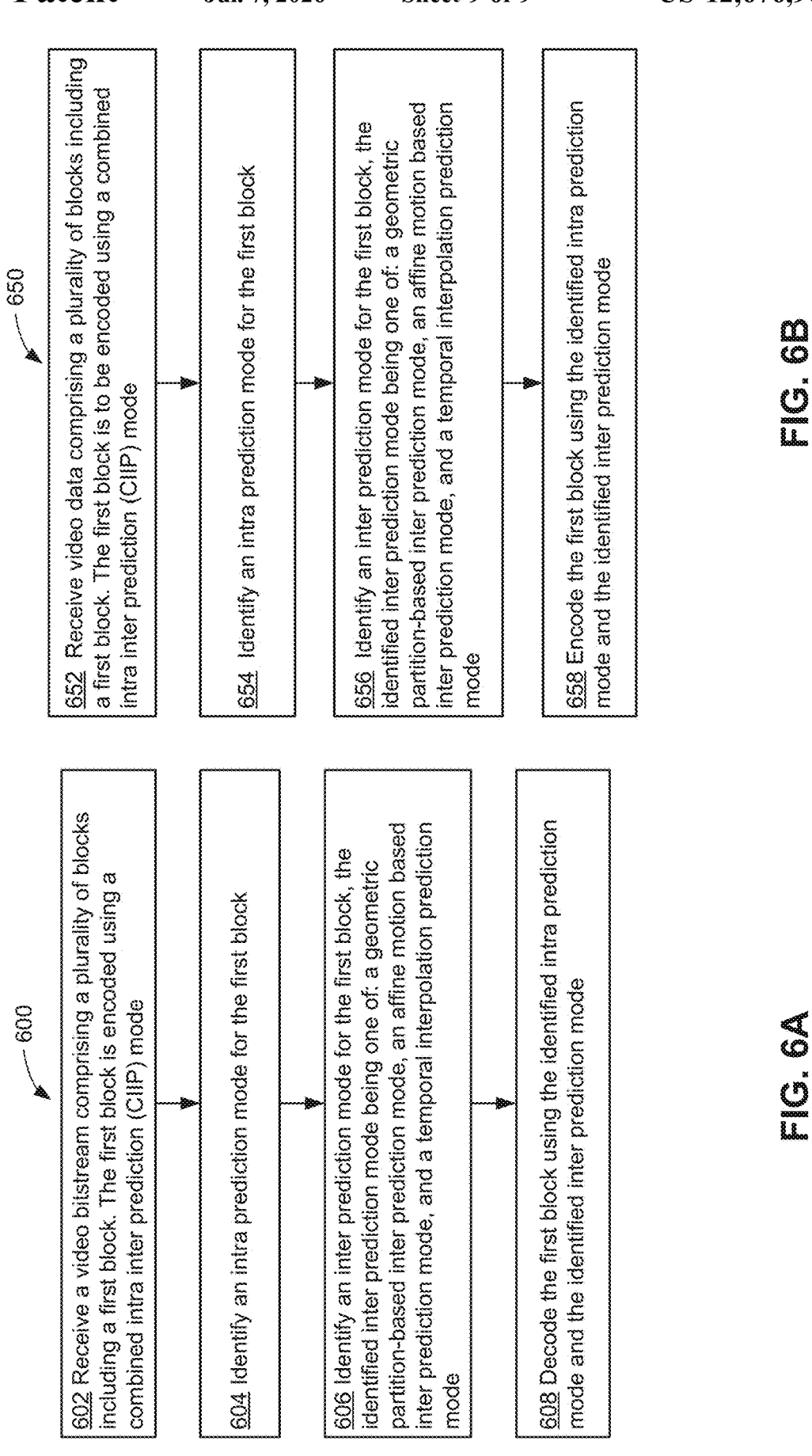

652 Receive video data comprising a plurality of blocks including a first block. The first block is to be encoded using a combined intra inter prediction (CIIP) mode 654 Identify an intra prediction mode for the first block 656 Identify an inter prediction mode for the first block, the identified inter prediction mode being one of: a geometric partition-based inter prediction mode, an affine motion based inter prediction mode, and a temporal interpolation prediction mode 658 Encode the first block using the identified intra prediction mode and the identified inter prediction mode

FIG. 6B

602 Receive a video bitstream comprising a plurality of blocks including a first block. The first block is encoded using a combined intra inter prediction (CIIP) mode 604 Identify an intra prediction mode for the first block 606 Identify an inter prediction mode for the first block, the identified inter prediction mode being one of: a geometric partition-based inter prediction mode, an affine motion based inter prediction mode, and a temporal interpolation prediction mode 608 Decode the first block using the identified intra prediction mode and the identified inter prediction mode

FIG. 6A

COMBINED INTRA AND INTER PREDICTION MODE

RELATED APPLICATIONS

This application claims priority to U.S. Provisional Patent Application No. 63/625,705, entitled "Combined Intra and Inter Prediction Mode," filed Jan. 26, 2024, which is hereby incorporated by reference in its entirety.

TECHNICAL FIELD

The disclosed embodiments relate generally to video coding, including but not limited to systems and methods for video coding with a combined intra inter prediction mode.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to a combined intra and inter prediction (CIIP) mode that combines intra and inter predictions to generate a final predicted block. For example, the intra prediction for the CIIP mode can be obtained using any intra prediction mode. The present disclosure describes techniques in which the inter prediction for the CIIP mode may be a geometric partition based inter prediction mode, an affine/warp motion based inter prediction mode, or a temporal interpolation prediction mode. An advantage of enabling the inter prediction to be one of these modes, as opposed to restricting the inter prediction to a translation mode, is that a more accurate motion vector (MV) may be obtained, which improves the video decoding accuracy.

In accordance with some embodiments, a method of video decoding includes: (i) receiving a video bitstream (e.g., a source video sequence) comprising a plurality of blocks (e.g., corresponding to one or more pictures) including a first block, where the first block is encoded using a combined intra inter prediction (CIIP) mode; (ii) identifying an intra prediction mode for the first block; (iii) identifying an inter prediction mode for the first block, the identified inter prediction mode being one of: (a) a geometric partition-based inter prediction mode, (b) an affine motion based inter prediction mode, and (c) a temporal interpolation prediction mode; and (iv) decoding the first block using the identified intra prediction mode and the identified inter prediction mode.

In accordance with some embodiments, a method of video encoding includes (i) receiving video data (e.g., a source video sequence) comprising a plurality of blocks (e.g., corresponding to one or more pictures) including a first block, where the first block is to be encoded using a combined intra inter prediction (CIIP) mode; (ii) identifying an intra prediction mode for the first block; (iii) identifying an inter prediction mode for the first block, the identified inter prediction mode being one of: (a) a geometric partition-based inter prediction mode, (b) an affine motion based inter prediction mode, and (c) a temporal interpolation prediction mode; and (iv) encoding the first block using the identified intra prediction mode and the identified inter prediction mode.

In accordance with some embodiments, a method of processing visual media data includes: (i) obtaining a source video sequence that comprises a plurality of frames; and (ii) performing a conversion between the source video sequence and a video bitstream of visual media data according to a format rule, (a) where the video bitstream comprises: a plurality of blocks including a first block, where the first block is encoded using a combined intra inter prediction (CIIP) mode; and (b) where the format rule specifies that an inter prediction mode of the CIIP mode is one of a geometric partition-based inter prediction mode, an affine motion-based inter prediction mode, and a temporal interpolation prediction mode.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
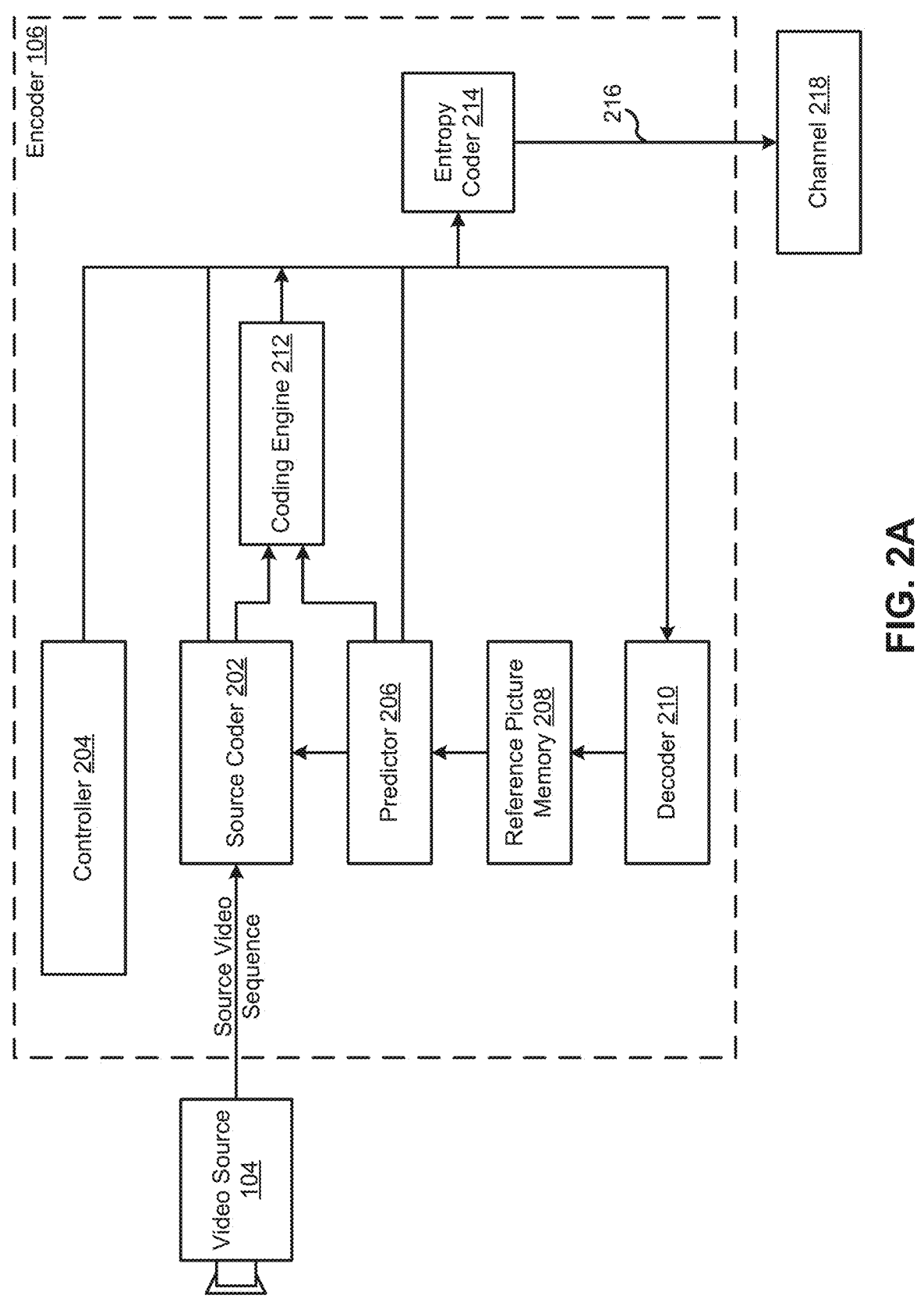
FIG. 2A is a block diagram illustrating example elements of an encoder component in accordance with some embodiments.

The present disclosure describes video/image compression techniques including encoding/decoding video blocks using a combined intra inter prediction (CIIP) mode in which an intra mode prediction is combined with an inter mode prediction to generate a final prediction block. In some conventional systems the inter mode prediction of the CIIP mode is generated using translational inter prediction mode. In this disclosure, systems and methods are described in which the inter mode prediction may be obtained from one of a geometric partition-based inter prediction mode, an affine motion based inter prediction mode, and a temporal interpolation prediction mode. Using non-translational inter prediction modes allows for more accurate motion vectors to be used during the CIIP encoding/decoding process, which improves the accuracy of the video coding.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device.

In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
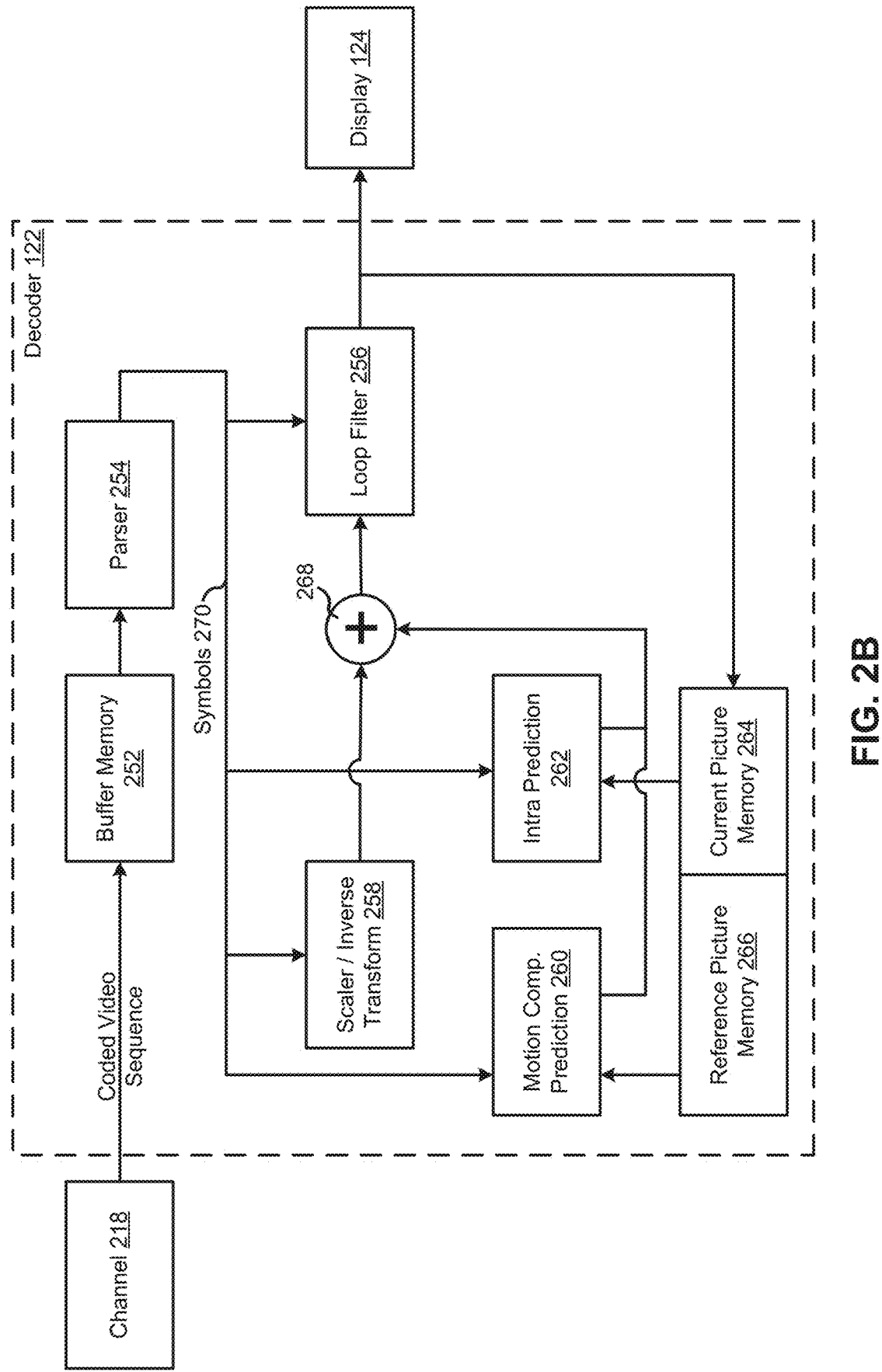
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
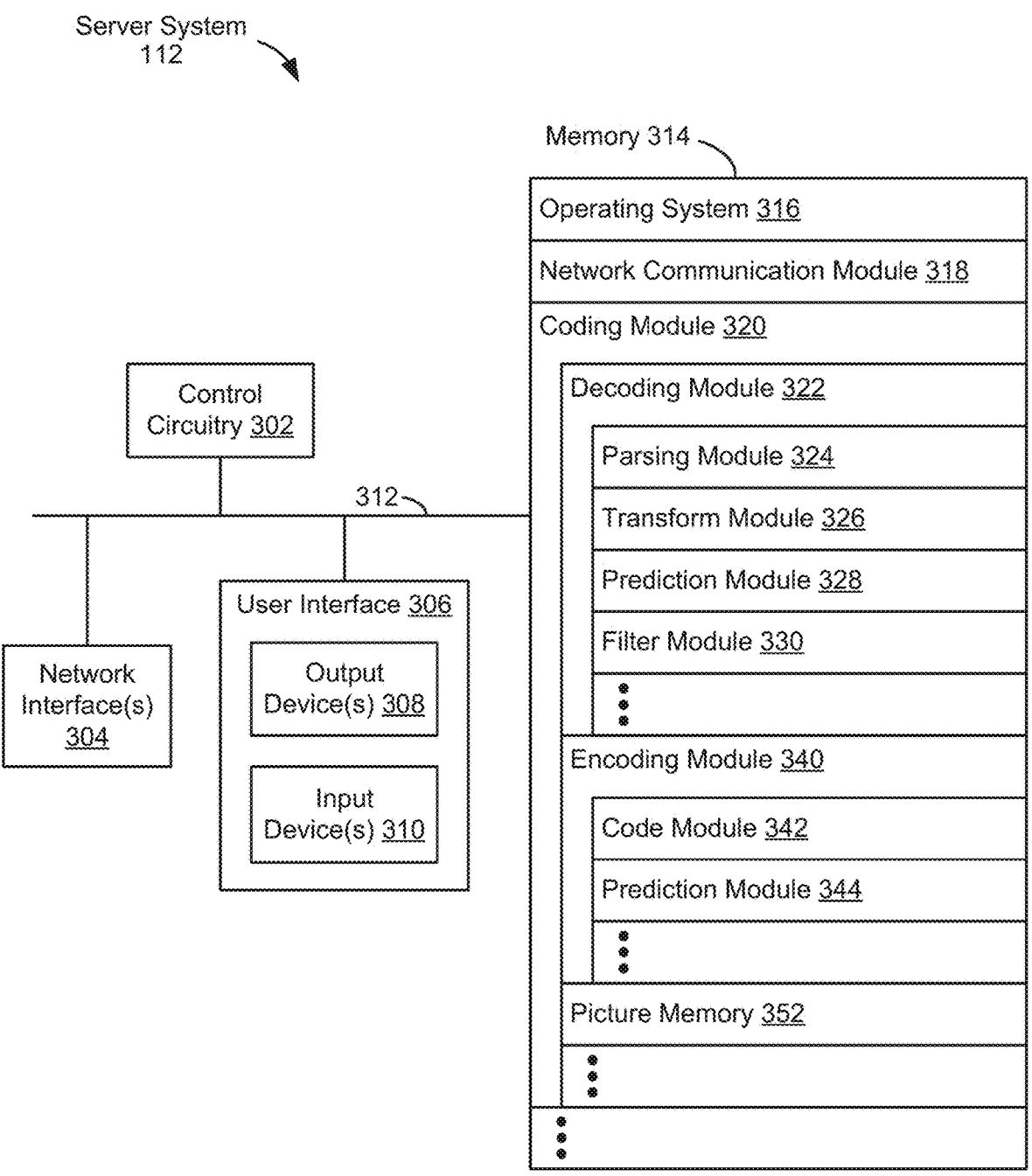
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, methods of combining non-translational inter prediction modes with intra prediction modes are described.

As described in detail below, a combined intra and inter prediction (CIIP) mode combines intra and inter predictions to generate the final predicted block. The intra prediction can be done using any intra prediction mode, such as DC prediction, directional/angular intra prediction modes, or intra prediction modes that model smooth transition of texture values. The intra and inter predictions may be combined using either wedge masks that splits the block into two sections at various angles. One section may be filled with intra predicted samples and the other one with inter predicted samples. Alternatively, the intra and inter predictions may be combined using a predefined weight set that gradually reduces the intra prediction weight along its prediction direction. In the CIIP mode, the prediction block is derived as a combination of intra prediction and inter prediction. The intra prediction block may be derived using the intra prediction with a prediction mode being one of the allowed intra prediction modes, and the inter prediction block may be derived using a single reference inter prediction with translational motion. Depending on how the weightings are derived for the intra prediction sample and inter prediction sample, different compound inter-intra prediction modes may be applied, including the conventional inter intra prediction mode and a wedge-based inter intra prediction mode.

As used herein, a smooth mode refers to an intra prediction mode that models smooth transition of texture values (e.g., the SMOOTH mode defined in AV1 or the Planar mode defined in HEVC/VVC).

Motion estimation involves determining motion vectors that describe the transformation from one image (picture) to another. The reference image (or block) can be from an adjacent frame in a video sequence. The motion vectors may relate to the whole image (global motion estimation) or a particular block. Additionally, the motion vectors can correspond to a translational or warped model that approximates the motion (e.g., rotation and translation in three dimensions and zoom). Motion estimated can be improved in some circumstances (e.g., with more complicated video objects) by further partitioning the blocks.

With regards to affine motion based inter prediction modes, motion compensation typically assumes a translational motion model between the reference and target block. However, warped motion utilizes an affine model. The affine motion model may be represented by Equation 1 below.

$$\text{Equation 1}$$

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix}$$

Affine Motion Model where [x, y] are coordinates of the original pixel and [x', y'] are the warped coordinates of the reference block. According to Equation 1, up to six parameters are needed to specify the warped motion: $a_3$ and $b_3$ specify a translational MV; $a_1$ and $b_2$ specify the scaling along the MV; and $a_2$ and $b_1$ specify the rotation.

In global warped motion compensation, global motion information is signaled for each inter reference frame, which includes a global motion type and several motion parameters. After signaling the reference frame index, if global motion is selected, the global motion type and the parameters associated with the given reference frame are used for the current coding block.

In local warped motion compensation, local warped motion may be allowed for an inter coding block when the following conditions are met. First, the current block must use a single reference prediction. The width or height of the coding block must be greater than or equal to eight. Finally, at least one of the adjacent neighboring blocks must use the same reference frame as the current block.

If local warped motion is used for the current block, the affine model parameters are estimated by mean-squared minimization of the difference between the reference and modeled projections based on the MVs of the current block and its adjacent neighboring blocks. To estimate the parameters of local warped motion, if the neighboring block uses the same reference frame as the current block, a projection sample pair of the center sample in the neighboring block and its corresponding sample in the reference frame are obtained. Subsequently, three extra samples are created by shifting the center position by a quarter sample in one or both dimensions. These extra samples may also be considered as projection sample pairs to ensure the stability of a model parameter estimation process.

The MVs of neighboring blocks, which are used to derive the motion parameters, are referred to as motion samples. The motion samples are selected from neighboring blocks that use the same reference frame as the current block. Note that the warped motion prediction mode is only enabled for blocks that use a single reference frame.

Figure 4A:
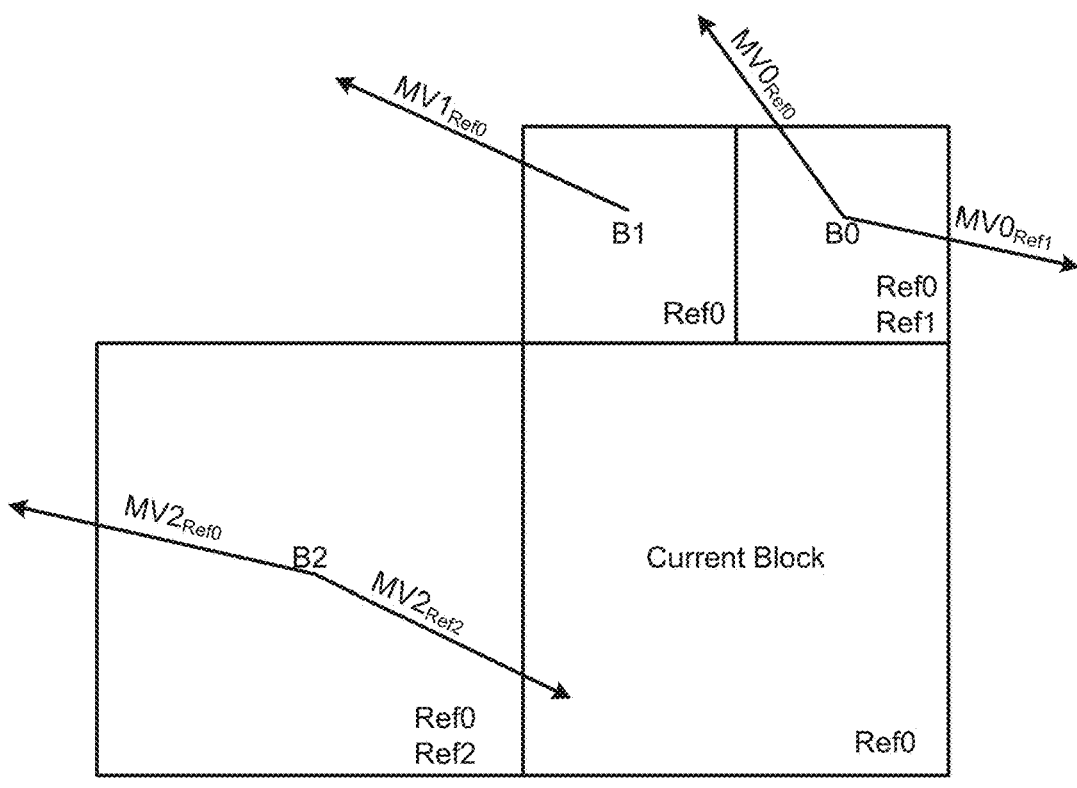
FIG. 4A illustrates example motions samples used for deriving model parameters of a block using local warped motion predictions in accordance with some embodiments.

FIG. 4A illustrates example motions samples used for deriving model parameters of a block using local warped motion predictions in accordance with some embodiments. As shown in FIG. 4A, the MVs of neighboring blocks B0, B1, and B2 are referred as MV0, MV1, and MV2, respectively. The current block is predicted using uni-prediction with reference frame Ref0. For example, the neighboring block B0 is predicted using compound prediction with reference frames Ref0 and Ref1; the neighboring block B1 is predicted using uni-prediction with reference frame Ref0; and the neighboring block B2 is predicted using compound prediction with reference frames Ref0 and Ref2. The motion vector $MV0_{Ref0}$ of B0, $MV1_{Ref0}$ of B1 and $MV2_{Ref0}$ of B2 may be used as the motion samples for deriving the affine motion parameters of the current block.

As mentioned above, two types of warped motion models may be supported: a global warp model and a local warp model. For example, the global warp model is associated with each reference frame, where each of the four non-translational parameters has 12-bit precision and the translational motion vector is coded in 15-bit precision. A coding block may choose to use it directly (provided the reference frame index). The global warp model captures the frame level scaling and rotation. As such, the global warp model primarily focuses on rigid motion over the entire frame. The local warp model at coding block level is also supported. In a local warp mode, also known as WARPED_CAUSAL, the warp parameters of the current block are derived by fitting a model to nearby motion vectors using least-squares.

Figure 4B:
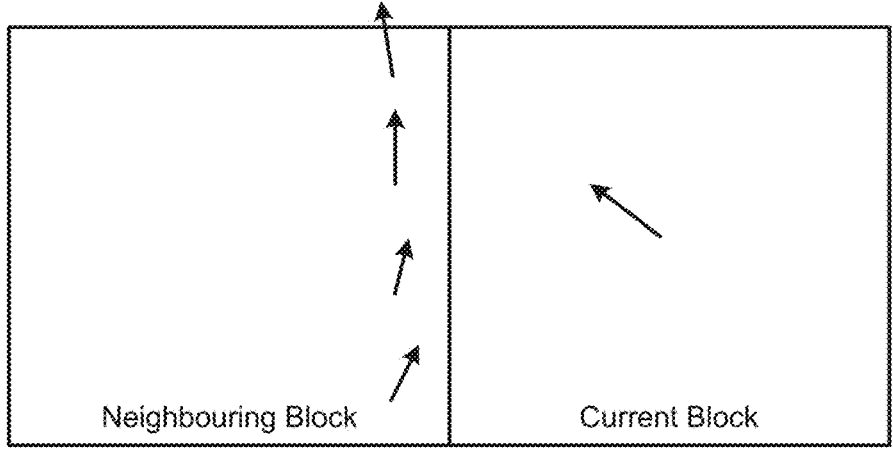
FIG. 4B illustrates motion vectors in blocks using a warp extend mode in accordance with to some embodiments.

In a warped motion mode, WARP_EXTEND, the motion of a neighboring block is smoothly extended into the current block, but with some ability to modify the warp parameters. This allows complex warping motions to be represented, spread across multiple blocks, while minimizing blocking artifacts. To accomplish this, the WARP_EXTEND mode, applied to NEWMV block, builds a new warp model based on two constraints: the per-pixel motion vectors generated by the new warp model should be continuous with the per-pixel motion vectors in a neighboring block, and the pixel at the center of the current block should have a per-pixel motion vector which matches the signalled motion vector for the block as a whole. FIG. 4B illustrates motion vectors in blocks using a warp extend mode in accordance with to some embodiments. As shown in FIG. 4B, for example, if the neighboring block at the left of the current block is warped, then a model which fits the motion vectors illustrated in FIG. 4B is used as the warp model.

The two constraints for building the new warp model imply certain equations involving the warp parameters of the neighboring block and the current block. These equations may then be solved to calculate the warp model for the current block. For example, if (A, . . . , F) represents the neighbor's warp model and (A', . . . , F') represents the new warp model, then the first constraint is as follows, at each point along the common edge:

$$Equation\ 2$$

$$\begin{pmatrix} A' & B' \\ C' & D' \end{pmatrix}\begin{pmatrix} x \\ y \end{pmatrix} + \begin{pmatrix} E' \\ F' \end{pmatrix} = \begin{pmatrix} A & B \\ C & D \end{pmatrix}\begin{pmatrix} x \\ y \end{pmatrix} + \begin{pmatrix} E \\ F \end{pmatrix}$$

First Constraint for Wrap Modeling

Note that the points along the edge have different values of y, but they all have the same value of x. This means that the coefficients of y must be the same on both sides (e.g., B'=B and D'=D). Meanwhile, the x coefficients provide equations relating the other coefficients, defined by Equation 3 below:

$$Equation\ 3$$

$$B' = B$$

$$D' = D$$

$$A'x + E' = Ax + E$$

$$C'x + F' = Cx + F$$

Coefficients for Warp Modeling where, in Equation 3, x is the horizontal position of the vertical column of pixels, so is effectively a constant. The second constraint specifies that the motion vector at the center of the block must equal the one signaled using the NEWMV mechanism. This provides two further equations, resulting in a system of six equations in six variables which has a unique solution. These equations may be solved efficiently, both in software and in hardware. The solution may be solved using basic addition, subtraction, multiplication, and divisions by powers of 2. As such, this mode is significantly less complex than the least-squares based local warp mode.

Note that there may be multiple neighboring blocks to extend from. Therefore, there needs to be a way to choose which block to extend from. This problem is similarly encountered in motion vector prediction. Specifically, there may be several possible motion vectors from nearby blocks, and the one should be selected as the base for NEWMV coding. The solution for this may be extended to handle the needs of WARP_EXTEND. This is done by tracking the source of each motion vector prediction. Then, WARP_EXTEND is only enabled if the selected motion vector prediction is taken from a directly neighboring block. Then, that block is used as the single "neighboring block" in the rest of the algorithm.

Note that sometimes the neighbor's warp model will be very good as-is, without needing any further modification. To make this case cheaper to code, WARP_EXTEND may be used for NEARMV blocks. The neighbor selection is the same as for NEWMV, except that the selection in NEWMV requires the neighbor be warped (not just translated via the translational motion). But if this is true, and WARP_EXTEND is selected, then the neighbor's warp model parameters are copied to the current block.

In some embodiments, a motion mode, WARP_DELTA, may be used. In this mode, the block's warp model is coded as a delta from a predicted warp model, similar to how motion vectors are coded as a delta from a predicted motion vector. The prediction may be sourced from either the global motion model (if any), or a neighboring block.

To avoid having multiple ways to encode the same predicted warp model, restrictions may be applied. For example, if the mode is NEARMV or NEWMV, then the same neighbor selection logic as described for WARP_EXTEND is used. If this results in a neighboring block which is warped, then that neighboring block's model (without applying the rest of the WARP_EXTEND logic) is used as the prediction. Otherwise, the global warp model is used as a base. Other restrictions may be applied. This example is not intended to limit the scope of embodiments. Then, a delta for each of the non-translational parameters may be coded. Finally, the translational part of the model is adjusted so that the per-pixel motion vector at the center of the block matches the block's overall motion vector.

As this tool (WARP_DELTA) involves explicitly coding a delta per warp parameter, it uses more bits to encode than the other warp modes. As such, WARP_DELTA may be disabled for blocks smaller than 16×16. However, the decode logic is extremely simple, and as such may represent more complex motion that the other warp modes cannot.

In an example single prediction mode (e.g., a WARPMV mode), the MV is derived from the warp model of the WRL list. The precision of the derived MV is set to ⅛th pel accuracy. In WARPMV mode, the dynamic reference list (DRL) is not used, therefore, the ref_mv_idx is not signaled.

The wedge or geometric partition mode (GPM) focuses on the inter-picture predicted CUs. When wedge or GPM is applied to a CU, the CU is split into two parts by a (straight) partitioning boundary. The location of the partitioning boundary may be mathematically defined by an angle parameter q and an offset parameter p, or a predefined look-up table. These parameters may be quantized and combined into a predefined partitioning index lookup table. The wedge/GPM partitioning index of the current CU may be coded into the bitstream. The two GPM/wedge partitions contain respective (e.g., individual, separate, and/or independent) motion information that is used to predict the corresponding parts in the current CU. In one example, only a unidirectional motion compensated prediction is allowed for each part of the GPM/wedge so that the required memory bandwidth for motion compensated prediction in the GPM/wedge is equal to that for the regular bidirectional motion compensated prediction.

After partitioning, the two GPM sections (partitions) contain individual motion information that can be used to predict the corresponding sections in the current block. In some embodiments, only a unidirectional motion-compensated prediction (MCP) is allowed for each section of the GPM so that the required memory bandwidth for MCP in the GPM is equal to that for the regular bidirectional MCP. To simplify the motion information coding and reduce the possible combinations for the GPM, the motion information can be coded with merge mode. The GPM merge candidate list can be derived from the merge candidate list, to ensure that only unidirectional motion information is contained.

Figure 5A:
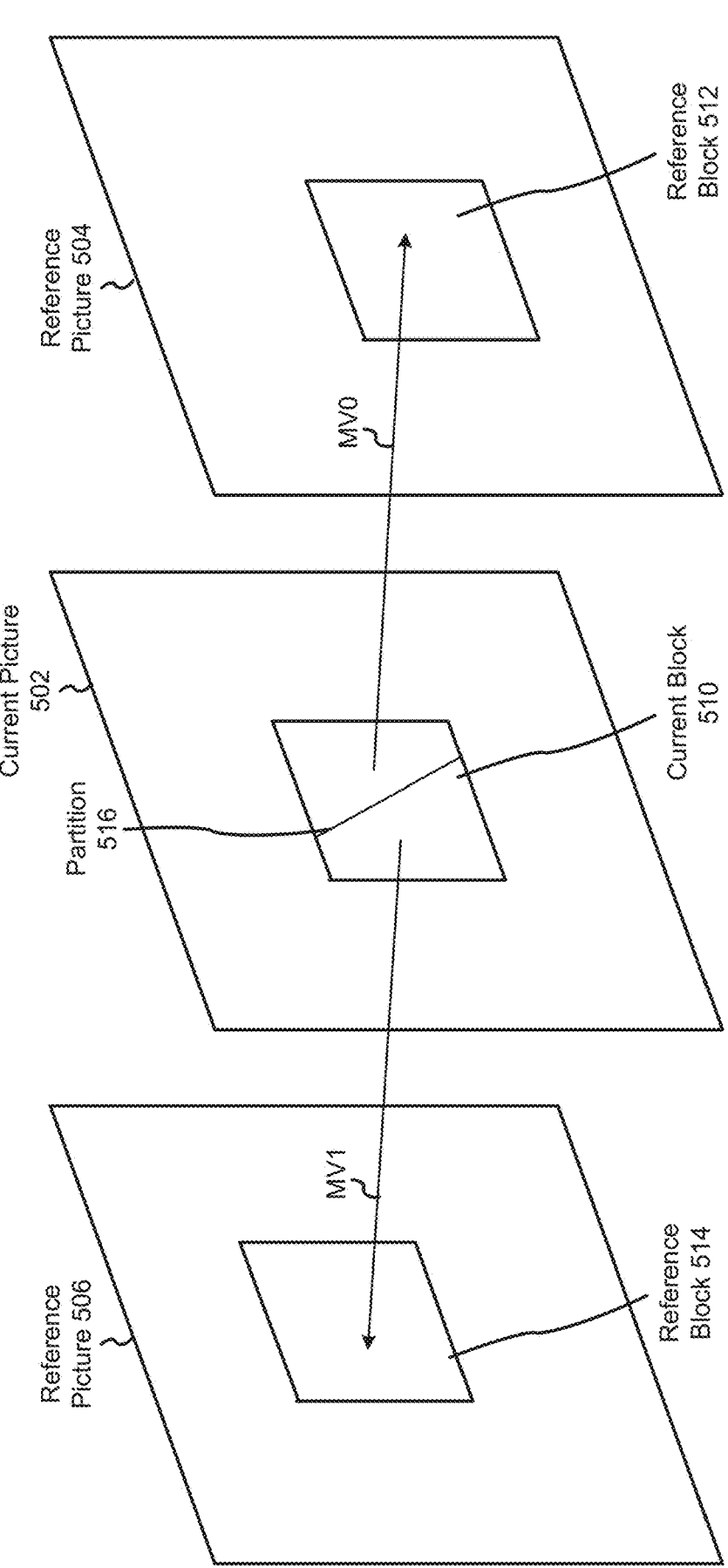
FIG. 5A shows an example of a partition-based prediction mode in accordance with some embodiments.

FIG. 5A illustrates a prediction process of GPM in accordance with some embodiments. A current block 510 is partitioned into a right-side section and a left-side section via a partition 516. The right-side predicted part of the current block 510 (e.g., a CU) of a current picture 502 (e.g., with a size of w×h) is predicted by MV0 from reference block 512 of reference picture 504, whereas the left-side part is predicted by MV1 from reference block 514 of reference picture 506.

Figure 5B:
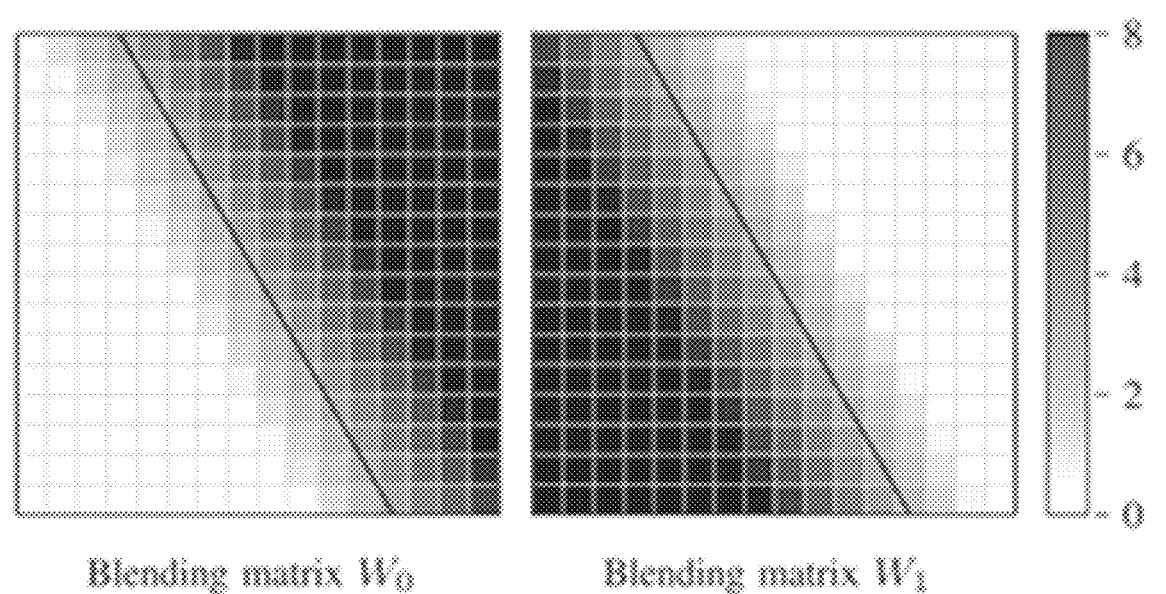
FIGS. 5B-5C show example partitioning mode blendings in accordance with some embodiments.

FIG. 5B illustrates example blending matrices for a partition (e.g., the partition 516) in accordance with some embodiments. In this example, a final GPM prediction (PG) is generated by performing a blending process using integer blending matrices W0 and W1, e.g., containing weights in the value range of 0 to 8. This can be expressed as:

Equation 4

$$PG = (W0 \cdot P0 + W1 \cdot P1 + 4) \gg 3$$

$$\text{with } W0 + W1 = 8J$$

Blended Prediction

In Equation 4, J is a matrix of ones with a size of w×h. The weights of the blending matrix may depend on the displacement between the sample location and the partitioning boundary. The computational complexity of blending matrices derivation can be low, so that these matrices can be generated on-the-fly at the decoder side. Note that $\gg$ in Equation 4 indicates a shift right operation.

Figure 5C:
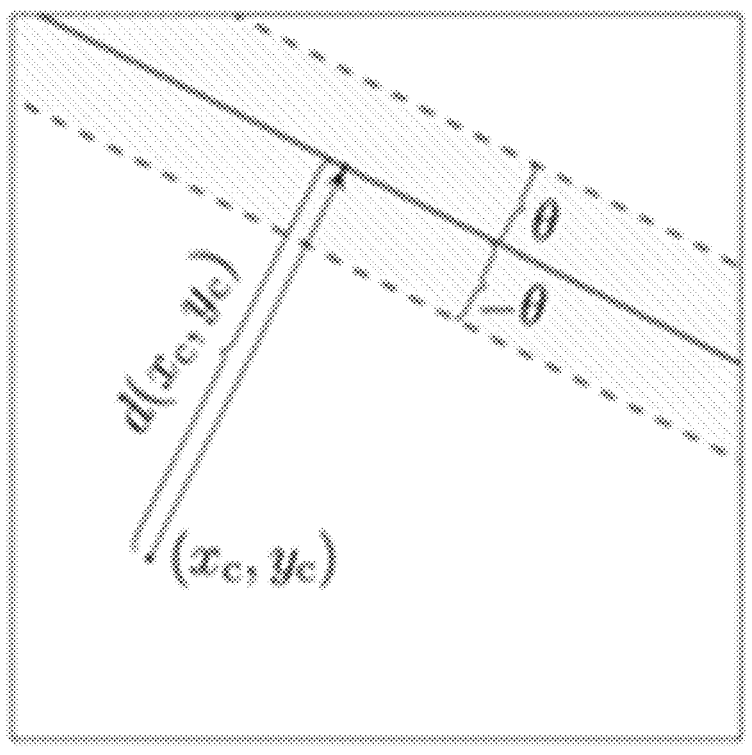

The generated GPM prediction (PG) can then be subtracted from the original signal to generate the residuals. The residuals may be transformed, quantized, and coded into the bitstream, e.g., using the regular VVC transformation, quantization, and entropy coding engines. At the decoder side, the signal is reconstructed by adding the residuals to the GPM prediction PG. A skip mode can also be supported by GPM, e.g., when the residuals are negligible. For example, the residual is dropped by the encoder, and the GPM prediction PG is directly used by the decoder as the reconstructed signal. The GPM can be further enhanced, e.g., by GPM+TM (bilateral matching), GPM+MMVD (merge mode with motion vector difference), and Inter+Intra GPM. As shown in FIG. 5C, the blending strength or blending area width θ may be fixed for all different contents.

A decoder-side motion vector refinement is a method that refines motion vectors using the decoder-side information, e.g., the reconstructed samples. Bilateral matching is a commonly used matching method for refinement. In the bilateral matching based decoder side motion vector refinement, two candidate predictor blocks may be directly compared using distortion metrics such as sum of absolute difference. The candidate blocks with the lowest distortion may be used as the refined block. Decoder side motion vector refinement can be performed at block level or subblock level. For example, in the subblock level, the current block is divided into multiple subblocks, and each subblock performs bilateral matching independently. The subblock based decoder-side motion vector refinement can achieve motion vector refinement at finer granularity (e.g., the subblock level) but the matching cost may be also less accurate as less samples are used to conclude the matching cost.

As discussed above, some codecs (e.g., AV1 and VVC) operate on pixel blocks. Each pixel block may be processed in a predictive-transform coding scheme, where a prediction is obtained using reference pixels and/or motion compensation. For inter-predicted blocks, motion parameters such as motion vectors, reference picture indices, reference picture list usage index, and/or additional information needed may be used for inter-predicted sample generation. The motion parameters can be signaled in an explicit or implicit manner. As discussed above, inter-predicted blocks can use temporal motion vectors and/or spatial motion vectors. Additionally, a subblock level motion vector refinement may be applied to extend a block-level TMVP.

Figure 5D:
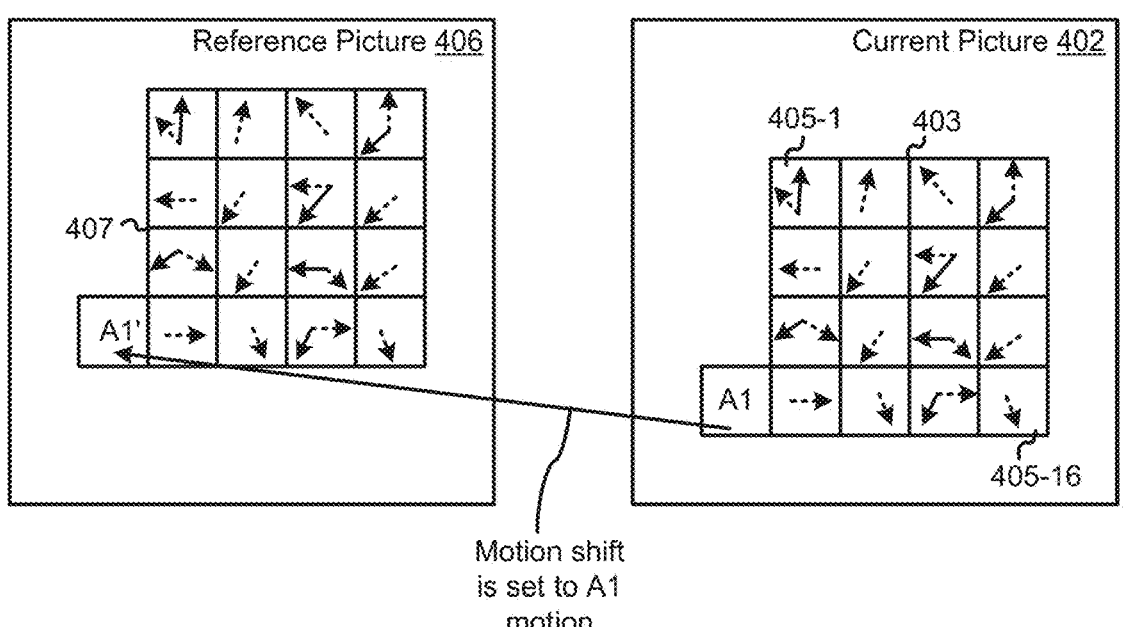
FIG. 5D illustrates an example of deriving subblock motion vectors in accordance with some embodiments.

FIG. 5D illustrates an example of deriving subblock motion vectors in accordance with some embodiments. In FIG. 5D, a current picture 402 includes a current block 403 that is composed of subblocks 405-1 through 405-15. The number and sizing of subblocks and blocks in FIG. 5D is merely an example and in other embodiments, different numbers and sizes of blocks and subblocks are used. FIG. 5D further shows a reference picture 406 with a reference block 407 corresponding to the current block 403. In some embodiments, the reference pictures 406 and 404 are different distances from the current picture 402. In the example of FIG. 5D, the reference block 407 is identified using a motion shift derived from the motion in block A1. The arrows in the subblocks in FIG. 5D illustrate motion vectors, with the dashed line arrows corresponding to motion from an L0 reference picture and the solid line arrows corresponding to motion from an L1 reference picture.

Thus, FIG. 5D illustrates an example of subblock-based TMVP (SbTMVP). SbTMVP may predict the motion vectors of the subblocks within the current block in two steps. In a first step, the spatial neighbor, denoted A1 in FIG. 5D, is identified. If A1 has a motion vector that uses the collocated picture as its reference picture, this motion vector is selected to be the motion shift (or displacement vector) to be applied. If no such motion is identified, then the motion shift may be set to (0, 0). The example in FIG. 5D uses a motion shift based on the motion vector from block A1.

In the second step, the motion shift identified in the first step is applied (e.g., added to the current block's coordinates) to obtain subblock-level motion information (motion vectors and reference indices) from the collocated picture as shown in FIG. 5D. Then, for each subblock, the motion information of its corresponding block (e.g., the smallest motion grid that covers the center sample) in the collocated picture is used to derive the motion information for the subblock. After the motion information of the collocated subblock is identified, it is converted to motion vectors and reference indices of the current subblock in a similar way as the TMVP process, where temporal motion scaling is applied to align the reference pictures of the temporal motion vectors to those of the current block.

As described above, SbTMVP allows inheriting the motion information at a subblock-level from a collocated reference picture. For example, each subblock of a large size coding block (e.g., a CU) can have its own motion information without explicitly transmitting a block partition structure or motion information. SbTMVP may obtain motion information for each subblock in three steps. The first step is the derivation of displacement vector (DV) of the current coding block. In step two, the availability of the SbTMVP candidate is accessed and central motion is derived. In step three, the subblock motion information is derived from the corresponding subblock by the DV. Thus, unlike TMVP candidate derivation which always derives the temporal motion vectors from the collocated block in the reference frame, SbTMVP may apply a DV which is derived from the MV of the left neighboring coding block of the current coding block to find the corresponding subblock in the collocated picture for each subblock of the current CU. In case the corresponding subblock is not inter-coded, the motion information of the current subblock may be set to be the central motion.

In this way, SbTMVP uses a motion field in a collocated picture to improve motion vector prediction and merge mode for coding blocks in the current picture. The same collocated picture used by TMVP may be used for SbTMVP. SbTMVP differs from TMVP in that TMVP predicts motion at a coding block level whereas SbTMVP predicts motion at sub-coding block level. Additionally, TMVP fetches temporal motion vectors from a collocated block in the collocated picture (e.g., the collocated block is the bottom-right or center block relative to the current CU), whereas SbTMVP applies a motion shift before fetching the temporal motion information from the collocated picture. The motion shift may be obtained from the motion vector from one of the spatial neighboring blocks of the current coding block.

Figure 5E:
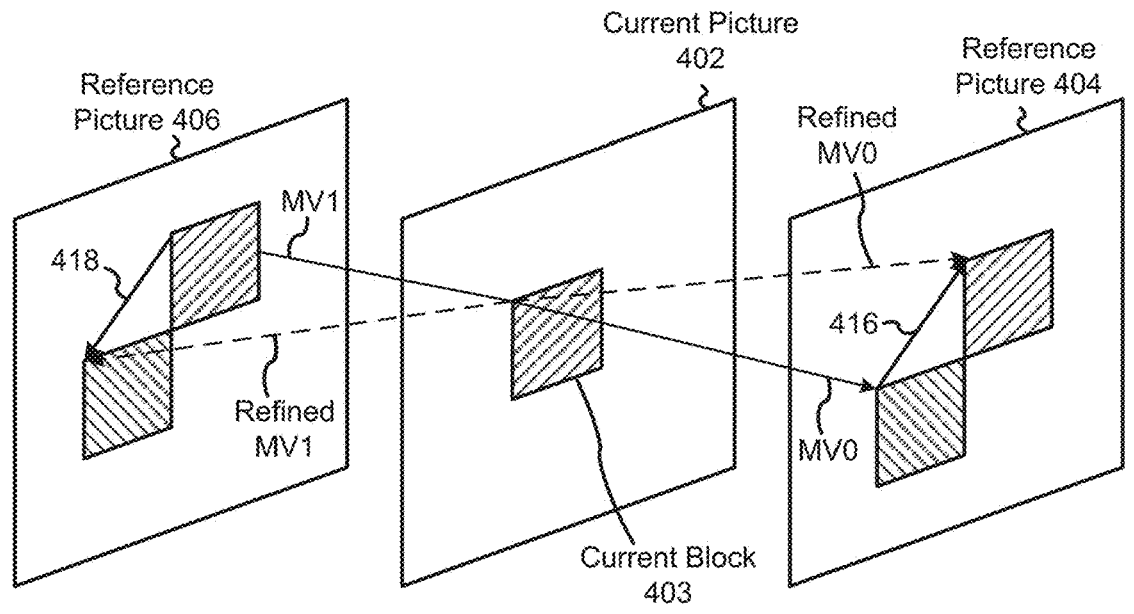
FIG. 5E illustrates an example of decoder-side motion vector refinement in accordance with some embodiments.

FIG. 5E illustrates an example of decoder-side motion vector refinement in accordance with some embodiments. In FIG. 5E, refined motion vectors (Refined MV0 and Refined MV1) are derived using a set of reference picture 404 and 406. An initial reference block may be identified in each reference picture using initial motion vectors, MV0 and MV1. A motion difference (indicated by arrows 416 and 418 in FIG. 5E) is applied to each motion vector to derive the refined motion vectors. Thus, FIG. 5E illustrates an example of decoder side motion vector refinement (DMVR) being applied to a coding block (e.g., in a merge mode). The pair of MVs obtained from a regular merge candidate may be used as input of the DMVR process. DMVR applies the bilateral matching (BM) to refine the input MV pair {mvL0, mvL1} and uses the refined MV pair for the motion compensated prediction (e.g., of both luma and chroma components). The output MV of DMVR, a refined MV pair, is defined in Equation Set 5:

Equation Set 5

$$mv_{refinedL0} = mv_{L0} + \Delta mv$$

$$mv_{refinedL1} = mv_{L1} - \Delta mv$$

Refined Motion Vector Pair

In Equation Set 5, a motion vector difference, Amv, is applied to the input MV pair to obtain the refined MV pair by using an MVD mirroring property (e.g., because the input MV pair point to two different reference pictures that have equal difference in picture order count (POC) to the current picture and these two reference pictures are at different temporal direction).

An integer sample offset search may be performed in DMVR. In an example implementation, a search space includes MV pair candidates (e.g., 25 pair candidates) as shown in Equation Set 6:

Equation Set 6

$$mv_{L0(i,j)} = mv_{L0(0,0)} + (i, j)$$

$$mv_{L1(i,j)} = mv_{L1(0,0)} - (i, j)$$

Search Space for MV Pair Candidates where (i, j) represents the coordinate of the search point around the initial MV pair, and i and j are integer value between −2 and 2 inclusive. The sum of absolute difference (SAD) for the initial MV pair is calculated as shown in Equation Set 7 below:

Equation Set 7

$$SAD(i, i) = K \sum_{n=0}^{\frac{H}{2}} \sum_{m=0}^{W} diff_{m,n}$$

$$diff_{m,n} = abs(P0_{ij}[m + i, 2n + j] - P1_{i,j}[m - i, 2n - j])$$

$$K = \begin{cases} 3/4 \ i = 0, j = 0 \\ 1 \ \text{otherwise} \end{cases}$$

SAD Calculation where W and H are the weight and height of the subblock. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. In some embodiments, e.g., to reduce the penalty of the uncertainty of DMVR refinement, the SAD between the reference blocks referred by the initial MV candidates is decreased by ¼ of the SAD value.

In some embodiments, the candidate MV pair selected in the integer sample offset search step is further refined. For example, the fractional sample refinement may be derived by using parametric error surface equation (e.g., to save the calculational complexity), instead of additional search with SAD comparison. The fractional sample refinement is conditionally invoked based on the output of the integer sample search stage. For example, the fractional sample refinement is conditionally invoked based on the output of the integer sample search stage. As an example, when the integer sample search stage is terminated with center having the smallest SAD in either the first iteration or the second iteration search, the fractional sample refinement is further applied.

BDOF may be used to refine the bi-prediction signal of a coding block (e.g., a CU). For example, BDOF may be performed at a 4×4 subblock level. BDOF may be applied to a coding block if it satisfies at least a subset of the following conditions: (i) the coding block is coded using a bi-prediction mode in which one of the two reference pictures is prior to the current picture in display order and the other is after the current picture in display order, (ii) the distances (e.g., the POC difference) from two reference pictures to the current picture are same, (iii) both of the reference pictures are short-term reference pictures, (iv) the coding block is not coded using an affine mode or an SbTVMP merge mode, (v) coding unit has more than 64 luma samples, (vi) the coding unit height and width are larger than or equal to 8 luma samples, (vii) BCW weight index indicates equal weight, (viii) WP is not enabled for the current coding block, and (ix) CIIP mode is not used for the current coding block. In some implementations, BDOF is only applied to a luma component.

The BDOF mode is based on an optical flow concept, which assumes that the motion of an object is smooth. For each subblock (e.g., 4×4 subblock), a motion refinement ($v_x$, $v_y$) may be calculated by minimizing the difference between the L0 and L1 prediction samples. The motion refinement can then be used to adjust the bi-predicted sample values in the subblock.

In some implementations, a multi-pass decoder-side motion vector refinement is applied. For example, in the first pass, bilateral matching (BM) is applied to the coding block, in the second pass, BM is applied to each 16×16 subblock within the coding block, and, in the third pass, the MV in each 8×8 subblock is refined by applying bi-directional optical flow (BDOF). The refined MVs may then be stored for subsequent spatial and/or temporal motion vector predictions.

As discussed above, decoder-side motion vector refinement refines motion vectors using the existing decoder-side information, e.g., the reconstructed samples. Additionally, an optical flow equation may be applied to formulate a least squares problem, from which fine motions can be derived from gradients of compound inter prediction samples. With those fine motions, the MV may be refined per subblock within a prediction block, thereby enhancing inter prediction quality. This implementation is an extension of BDOF as it supports MV refinement when the two reference blocks have arbitrary temporal distances to the current block. The gradient of the current whole block predictors may be precomputed and the subblock refined MVs may then be computed depending on the optical flow model.

Bilateral matching may be used for the MV refinement. In bilateral matching-based decoder side motion vector refinement, two candidate predictor blocks may be directly compared using distortion metrics such as the sum of absolute difference (SAD). The candidate blocks with lowest distortion may then be used as the refined block. Decoder side motion vector refinement can be performed at block level or subblock level. In the subblock level, the current block is divided into multiple subblocks, and each subblock bilateral matching is performed independently. The subblock based decoder-side motion vector refinement can achieve motion vector refinement at finer granularity, e.g., the subblock level, but the matching cost may be also less accurate as less samples are used to conclude the matching cost.

Prefetched samples referenced herein refer to a restricted maximum number of samples from the reference pictures that can be used in the bilateral matching process. Prefetching area referenced herein refers to the area occupied by the prefetched samples. The higher number of prefetched samples requires higher memory bandwidth when performing the bilateral matching process.

In some embodiments, if the block is coded as compound mode with bi-directional reference frame, MVs of the blocks are refined before applying the optical flow refinement. In some embodiments, if the block size is larger than 16×16, the block is divided into a number of 16×16 subblocks. If the block size is less than or equal to 16×16, the refinement is done on a full block basis. For each sub-block, an offset motion vector (e.g., called AMV) may be derived. The offset motion vector of a subblock may be found by searching neighboring areas of initial motion vectors MV0 and MV1. For example, the decoder searches a predefined 5×5 area with center at the initial motion vectors and selects the offset which produces the minimum sum of absolute values (SAD) between P0 and P1. In some embodiments, only the integer offsets are searched.

In some embodiments, only integer offsets are searched, and a bi-linear interpolation filter is used during searching. In some embodiments, after computing the SAD of each offset, the SAD value is checked with a threshold value. If the SAD is lower than (width*height), search is terminated. In some embodiments, the MV refinement is applied for both chroma and luma channels. In some embodiments, the search is performed only for the luma channel and the refined MV values are stored for reuse by a chroma channel.

As used herein, a temporally interpolated prediction (also sometimes referred to as a temporal interpolated prediction) refers to an inter prediction mode that derives an inter prediction block using a block (or a reference frame) that is generated by interpolating the current block using coded pictures and motion vectors.

Some embodiments include the use of compound inter modes. Compound inter modes create a prediction of a block by combining two hypotheses from two different reference frames. In these modes two motion information components (e.g., motion vectors) may be sent in the bitstream. Although motion vectors may be well predicted using predictors from the spatial and temporal neighbors or the historical motion vectors, the bytes used for motion information can still be quite significant for a lot of content and applications.

In some embodiments, an inter prediction mode is based on a temporal interpolation technique. For example, an intermediate frame can be generated through interpolation by exploiting the already available motion vector fields of a forward and a backward reference frame. This interpolated frame may have a high correlation with the current coding frame. Therefore, it can either be used as an additional reference frame for the current frame, or can be directly associated with the current frame as the output of the decoder for that instance without performing any additional coding steps. The temporal interpolation technique may be based on a direct projection of the existing motion vectors in the available reference frames without performing any additional motion estimation. In some embodiments, the temporal interpolated prediction (TIP) mode may only be enabled in a random access mode.

A TIP process may include combining information in two reference frames and projecting to the same time instance as the current frame using an interpolation process. In an example TIP mode, the interpolated frame (TIP frame) may be used as an additional reference frame. A coding block of the current frame can directly reference the interpolated frame and utilize the information coming from two different references with only the overhead cost of a single inter prediction mode. In another example TIP mode, the interpolated frame may be directly assigned as the output of the decoding process for the current frame (e.g., skipping other traditional coding steps).

In an example process, first a TIP frame is generated. The TIP frame is then used as either an additional reference frame for the current frame, or is directly assigned as the reconstructed output of the decoder for the current frame. The TIP mode used may be indicated using a syntax element, e.g., named as tip_frame_mode.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

Some embodiments disclose an adaptive frame padding method for reconstructing a picture in a video bitstream. The system receives (602) a video bitstream (e.g., a coded video sequence) comprising a plurality of blocks (e.g., corresponding to a set of pictures) including a first block encoded using a combined intra inter prediction (CIIP) mode. The system identifies (604) an intra prediction mode for the first block. The system identifies (606) an inter prediction mode for the first block, the identified inter prediction mode being one of a geometric partition-based inter prediction mode, an affine motion based inter prediction mode, and a temporal interpolation prediction mode. The system decodes (608) the first block using the identified intra prediction mode and the identified inter prediction mode. In this way, the inter prediction part in the combined intra and inter prediction mode can employ wedge (or geometric partition based) inter prediction or warp motion (or affine motion) based inter prediction.

In some embodiments, when wedge or geometric partitioning-based or warp motion-based method is employed for the inter prediction of combined intra and inter prediction mode, only the predefined weight set can be used to blend the intra prediction samples and inter predictions and generate the final prediction samples. In this way, the wedge mask based weighting factors are not allowed to blend the intra and inter prediction samples in this case.

In some embodiments, the predefined weighting factors can be either a) same for all the samples within the prediction block; or b) gradually reduces the intra prediction weight along its prediction direction.

In some embodiments, when wedge or geometric partitioning-based method is employed for the inter prediction of combined intra and inter prediction mode, the wedge mask used for generating the inter prediction may also be used to combine the intra and inter prediction samples.

In some embodiments, when the intra prediction mode is from a predefined intra prediction mode set, wedge or geometric partitioning-based or warp motion method can be employed for the inter prediction of combined intra and inter prediction mode. For example, the predefined intra prediction mode set includes only DC and/or smooth mode. In another example, the predefined intra prediction mode set includes only DC, smooth mode, angular intra (such as VERTICAL, or HORIZONTAL intra prediction) prediction mode.

In some embodiments, when warp motion is employed for the inter prediction of combined intra and inter prediction mode, warp motion mode is set as a predefined warp motion mode. In some embodiments, the warp motion mode is set to the warp model which derives the model parameters with the linear equation method, and the warp model parameters are not transmitted into the bitstream, such as WARP_CAUSAL mode. In some embodiments, the warp motion mode is set to the warp model which extends the warp model parameters from the neighboring blocks to current block, such as WARP_EXTENDED mode. In some embodiments, the predefined warp motion mode can be signaled into the bitstream via sequence/frame/slice high level syntax.

In some embodiments, when warp motion is employed for the inter prediction of combined intra and inter prediction mode, warp motion mode can only be selected from a subset of allowed warp motion modes. For example, the warp motion mode may only be WARP_CAUSAL mode or WARP_EXTENDED mode.

In some embodiments, one high level syntax in sequence, frame, or slice level is parsed into the bitstream to indicate whether wedge (or geometric partition based) inter prediction or warp motion can be applied to combined intra and inter prediction mode or not.

In some embodiments, a decoder side motion refinement method is applied to the combined intra and inter prediction mode to refine the motion vector for the inter prediction part. In some embodiments, the bilateral matching based decoder side motion vector refinement is employed for the inter prediction part of combined intra and inter prediction mode. In some embodiments, inter prediction samples of current block are compared with intra prediction samples of current block using distortion metrics such as sum of absolute difference. The offset (or delta) motion vector can be found by searching the neighboring areas of decoded motion vector MO for inter prediction part. In some embodiments, after applying the bilateral matching based method for combined intra and inter prediction mode, the intra prediction part is kept unchanged and the motion vector of inter prediction part may be refined.

In some embodiments, the optical flow based motion vector refinement method, or optical flow based prediction refinement method, is employed for the inter prediction part of combined intra and inter prediction mode. In some embodiments, the refinement is applied to the mean removed intra and inter prediction mode.

In some embodiments, one high level syntax in a sequence, frame, or slice level is parsed into the bitstream to indicate whether a decoder side motion refinement method can be applied to combined intra and inter prediction mode or not.

In some embodiments, a temporally interpolation prediction mode is applied to derive the inter prediction block in a combined intra and inter prediction mode.

In some embodiments, the weightings between inter and intra prediction blocks in combined inter and intra prediction mode are dependent based on which inter prediction mode is used to derive the inter prediction mode and/or which intra prediction mode is used to derive the intra prediction mode.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314)

of the computing system. In some embodiments, the method 650 is performed by a same system as the method 600 described above.

The system receives (652) video data (e.g., a source video sequence) comprising a plurality of blocks (e.g., corresponding to a set of pictures) including a first block to be encoded using a combined intra inter prediction (CIIP) mode. The system identifies (654) an intra prediction mode for the first block. The system identifies (656) an inter prediction mode for the first block, the identified inter prediction mode being one of a geometric partition-based inter prediction mode, an affine motion based inter prediction mode, and a temporal interpolation prediction mode. The system encodes (658) the first block using the identified intra prediction mode and the identified inter prediction mode. As described previously, the encoding process may mirror the decoding processes described herein (e.g., applying a CIIP mode). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) including a first block, where the first block is encoded using a combined intra inter prediction (CIIP) mode; (ii) identifying an intra prediction mode for the first block; (iii) identifying an inter prediction mode for the first block, the identified inter prediction mode being one of: (a) a geometric partition-based inter prediction mode, (b) an affine motion based inter prediction mode, and (c) a temporal interpolation prediction mode; and (iv) decoding the first block using the identified intra prediction mode and the identified inter prediction mode. For example, the inter prediction part in a CIIP mode may employ wedge (or other geometric partition based) inter prediction, warp motion (or affine motion) based inter prediction, or a temporal interpolation prediction mode. In some embodiments, the inter prediction mode is selected from a group consisting of a geometric partition based inter prediction mode, an affine/warp motion based inter prediction mode, a temporal interpolation prediction mode, and a translational inter prediction mode. In some embodiments, the inter prediction mode is selected from a group consisting of a temporal interpolation prediction mode and a translational inter prediction mode. In some embodiments, the inter prediction mode is selected from a group consisting of a geometric partition based inter prediction mode, an affine/warp motion based inter prediction mode, and a translational inter prediction mode.

(A2) In some embodiments of A1, decoding the first block using the identified intra prediction mode and the identified inter prediction mode comprises using a weighted combination of the identified intra prediction mode and the identified inter prediction mode, where the weighted combination uses a predefined set of weights. For example, when a wedge or geometric partitioning-based or warp motion-based method is employed for the inter prediction, only a predefined weight set is allowed to be used to blend the intra prediction samples and inter predictions and generate the final prediction samples. In this way, the wedge mask based weighting factors are not allowed to blend the intra and inter prediction samples.

(A3) In some embodiments of A2, the predefined set of weights comprises a same weight applied to each sample of the first block.

(A4) In some embodiments of A2, the predefined set of weights have reduced intra prediction weights according to an intra prediction angle. For example, the predefined weighting factors may be either the same for all the samples within the prediction block, or gradually reduce the intra prediction weight along its prediction direction.

(A5) In some embodiments of any of A2-A4, the predefined set of weights are identified based on at least one of the identified intra prediction mode and the identified inter prediction mode. For example, the weightings between inter and intra prediction blocks in combined inter and intra prediction mode can be dependent based on which inter prediction mode is used to derive the inter prediction mode and/or which intra prediction mode is used to derive the intra prediction mode.

(A6) In some embodiments of any of A1-A5, (i) the identified inter prediction mode is the geometric partition-based inter prediction mode using a wedge mask; and (ii) decoding the first block using the identified intra prediction mode and the identified inter prediction mode comprises using the wedge mask to combine inter prediction samples and intra prediction samples. For example, when a wedge or geometric partitioning-based method is employed for the inter prediction, the wedge mask used for generating the inter prediction may also be used to combine the intra and inter prediction samples.

(A7) In some embodiments of any of A1-A6, the inter prediction mode for the first block is selected from a group comprising the geometric partition based inter prediction mode, the affine motion based inter prediction mode, and the temporally interpolation prediction mode when the identified intra prediction mode is one of a predefined set of intra prediction modes. For example, when the intra prediction mode is from a predefined intra prediction mode set, wedge or geometric partitioning-based or warp motion method may be employed for the inter prediction of the combined intra and inter prediction mode. In some embodiments, the inter prediction mode for the first block is selected from a group consisting of the geometric partition based inter prediction mode, the affine motion based inter prediction mode, and the temporally interpolation prediction mode. In some embodiments, the inter prediction mode for the first block is selected from a group consisting of the geometric partition based inter prediction mode, the affine motion based inter prediction mode, the temporally interpolation prediction mode, and a translational inter prediction mode. In some embodiments, the inter prediction mode for the first block is selected from a group comprising the geometric partition based inter prediction mode, the affine motion based inter prediction mode, and the temporally interpolation prediction mode in accordance with a determination that the identified intra prediction mode is one of the predefined set of intra prediction modes.

(A8) In some embodiments of A7, the predefined set of intra prediction modes consists of a smooth intra prediction mode and a direct current (DC) intra prediction mode. For example, the predefined intra prediction mode set includes only DC and/or smooth mode.

(A9) In some embodiments of A7, the predefined set of intra prediction modes consists of a smooth intra prediction mode, a direct current (DC) intra prediction mode, and a set of angular intra prediction modes. For example, the predefined intra prediction mode set includes only DC, smooth, and angular intra (such as vertical and horizontal intra prediction) prediction modes.

(A10) In some embodiments of any of A1-A5 and A6-A9, identifying the inter prediction mode comprises identifying a predefined warp motion mode as the affine motion based inter prediction mode. For example, when warp motion is employed for the inter prediction of the CIIP mode, warp motion mode is set as a predefined warp motion mode.

(A11) In some embodiments of A10, the video bitstream does not include warp model parameters for the first block. For example, the warp motion mode is set to a warp model that derives the model parameters with a linear equation, and the warp model parameters are not transmitted into the bitstream, such as a warp_causal mode.

(A12) In some embodiments of A10 or A11, the predefined warp motion mode uses a warp model with warp model parameters from one or more neighboring blocks of the first block. For example, the warp motion mode is set to the warp model which extends the warp model parameters from the neighboring blocks to the current block, such as a warp_extended mode.

(A13) In some embodiments of A10, the predefined warp motion mode is signaled in the video bitstream. For example, the predefined warp motion mode can be signaled into the bitstream via sequence/frame/slice high level syntax. In some embodiments, one or more parameters for the predefined warp motion mode are signaled in the video bitstream. For example, the warp motion mode may be a delta warp mode and a set of delta values may be signaled for the first block.

(A14) In some embodiments of any of A10-A13, the predefined warp motion mode is selected from a subset of allowed warp motion modes. For example, when warp motion is employed for the inter prediction of the CIIP mode, the warp motion mode may only be selected from a subset of allowed warp motion modes. In some embodiments, the subset of allowed warp motion modes consists of a warp_causal mode and a warp_extended mode. For example, the warp motion mode can only be warp_causal mode or warp_extended mode.

(A15) In some embodiments of any of A1-A14, the inter prediction mode is identified for the first block based on an indicator in the video bitstream. For example, a high-level syntax in the bitstream may be parsed to determine whether a wedge (or geometric partition based) inter prediction or a warp motion inter prediction may be applied to the CIIP mode.

(A16) In some embodiments of any of A1-A15, further comprising applying a motion vector refinement to a motion vector of the identified inter prediction mode. For example, a decoder side motion refinement method may be applied to the CIIP mode to refine the motion vector for the inter prediction part. In some embodiments, the motion vector refinement is applied when an indicator in the video bitstream indicates that the motion vector refinement is to be applied. For example, high level syntax is parsed from the bitstream to determine whether decoder side motion refinement method can be applied to the CIIP mode. In some embodiments, applying the motion vector refinement comprises applying a refinement to a mean removed intra and inter prediction mode. For example, the refinement can be applied to the mean removed intra and inter prediction mode. In some embodiments, applying the motion vector refinement comprises using bilateral matching. For example, bilateral matching based decoder side motion vector refinement is employed for the inter prediction part of the CIIP mode. In some embodiments, after applying the bilateral matching based method for the CIIP mode, the intra prediction part is kept unchanged and a motion vector of inter prediction part is refined.

(A17) In some embodiments of A16, applying the motion vector refinement comprises comparing inter prediction samples for the first block with intra prediction samples for the first block. For example, inter prediction samples of a current block are compared with intra prediction samples of the current block using distortion metrics such as sum of absolute difference. The offset (or delta) motion vector can be found by searching the neighboring areas of decoded motion vector MO for inter prediction part.

(A18) In some embodiments of A16, the motion vector refinement is an optical flow based motion vector refinement. For example, an optical flow based motion vector refinement method, or optical flow based prediction refinement method, is employed for the inter prediction part of a CIIP mode.

(B1) In another aspect, some embodiments include a method (e.g., the method 650) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising (i) receiving video data comprising a plurality of blocks including a first block, where the first block is to be encoded using a combined intra inter prediction (CIIP) mode; (ii) identifying an intra prediction mode for the first block; (iii) identifying an inter prediction mode for the first block, the identified inter prediction mode being one of: (a) a geometric partition-based inter prediction mode, (b) an affine motion based inter prediction mode, and (c) a temporal interpolation prediction mode; and (iv) encoding the first block using the identified intra prediction mode and the identified inter prediction mode.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a plurality of blocks including a first block, where the first block is encoded using a combined intra inter prediction (CIIP) mode. The format rule specifies that an inter prediction mode of the CIIP mode is one of a geometric partition-based inter prediction mode, an affine motion-based inter prediction mode, and a temporal interpolation prediction mode.

(D1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) including a first block, where the first block is encoded using a combined intra inter prediction (CIIP) mode; (ii) identifying an intra prediction mode for the first block; (iii) identifying an inter prediction mode for the first block; (iv) obtaining a motion vector for the first block using the inter prediction mode; (v) refining the motion vector for the first block using a motion vector refinement technique; and (vi) decoding the first block using the identified intra prediction mode and the refined motion vector. Refining the motion vectors for a CIIP mode can improve the accuracy of the motion vectors, which in turn improves the coding accuracy as compared to a CIIP mode without motion vector refinement.

(D2) In some embodiments of D1, the motion vector refinement technique comprises at least one of a decoder side motion vector refinement, and an optical flow based motion vector refinement.

(D3) In some embodiments of D1 or D2, the CIIP mode includes a non-translational inter prediction mode as described in any of A1-A18.

(E1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) including a first block, where the first block is encoded using a combined intra inter prediction (CIIP) mode; (ii) identifying an intra prediction mode for the first block; (iii) identifying a temporal interpolation prediction mode for the first block; and (iv) decoding the first block using the identified intra prediction mode and the identified temporal interpolation prediction mode.

(E2) In some embodiments of E1, the CIIP mode includes a non-translational inter prediction mode as described in any of A1-A18.

(F1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) including a first block, where the first block is encoded using a combined intra inter prediction (CIIP) mode; (ii) identifying an intra prediction mode for the first block; (iii) identifying an inter prediction mode for the first block; (iv) identifying a set of weights based on one or more of the identified intra prediction mode and the identified inter prediction mode; and (v) decoding the first block by combining first samples obtained using the identified intra prediction mode with second samples obtained using the identified inter prediction mode using the set of weights. Adjusting the weighting for the combination of the intra prediction and the inter prediction allows for greater coding accuracy (e.g., by weighting the more likely prediction higher and/or reducing the weight assigned to an unlikely prediction) as compared to CIIP mode combinations that use preset weights.

(F2) In some embodiments of F1, the CIIP mode includes a non-translational inter prediction mode as described in any of A1-A18.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18, B1, C1, D1-D3, E1-E2, and F1-F2 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18, B1, C1, D1-D3, E1-E2, and F1-F2 above).

Unless otherwise specified, any of the syntax elements (e.g., indicators) described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of blocks including a first block, wherein the first block is encoded using a combined intra inter prediction (CIIP) mode;

identifying an intra prediction mode for the first block;

identifying an inter prediction mode for the first block, the identified inter prediction mode being one of:

a geometric partition-based inter prediction mode, an affine motion based inter prediction mode, and a temporal interpolation prediction mode; and decoding the first block using the identified intra prediction mode and the identified inter prediction mode, wherein the inter prediction mode for the first block is selected from a group comprising the geometric partition-based inter prediction mode, the affine motion based inter prediction mode, and the temporal interpolation prediction mode when the identified intra prediction mode is one of a predefined set of intra prediction modes.

2. The method of claim 1, wherein decoding the first block using the identified intra prediction mode and the identified inter prediction mode comprises using a weighted combination of the identified intra prediction mode and the identified inter prediction mode, wherein the weighted combination uses a predefined set of weights.

3. The method of claim 2, wherein the predefined set of weights comprises a same weight applied to each sample of the first block.

4. The method of claim 2, wherein the predefined set of weights have reduced intra prediction weights according to an intra prediction angle.

5. The method of claim 2, wherein the predefined set of weights are identified based on at least one of the identified intra prediction mode and the identified inter prediction mode.

6. The method of claim 1, wherein:

the identified inter prediction mode is the geometric partition-based inter prediction mode using a wedge mask; and decoding the first block using the identified intra prediction mode and the identified inter prediction mode comprises using the wedge mask to combine inter prediction samples and intra prediction samples.

7. The method of claim 1, wherein the predefined set of intra prediction modes consists of a smooth intra prediction mode and a direct current (DC) intra prediction mode.

8. The method of claim 1, wherein the predefined set of intra prediction modes consists of a smooth intra prediction mode, a direct current (DC) intra prediction mode, and a set of angular intra prediction modes.

9. The method of claim 1, wherein identifying the inter prediction mode comprises identifying a predefined warp motion mode as the affine motion based inter prediction mode.

10. The method of claim 9, wherein the video bitstream does not include warp model parameters for the first block.

11. The method of claim 9, wherein the predefined warp motion mode uses a warp model with warp model parameters from one or more neighboring blocks of the first block.

12. The method of claim 9, wherein the predefined warp motion mode is signaled in the video bitstream.

13. The method of claim 9, wherein the predefined warp motion mode is selected from a subset of allowed warp motion modes.

14. The method of claim 1, wherein the inter prediction mode is identified for the first block based on an indicator in the video bitstream.

15. The method of claim 1, further comprising applying a motion vector refinement to a motion vector of the identified inter prediction mode.

16. The method of claim 15, wherein applying the motion vector refinement comprises comparing inter prediction samples for the first block with intra prediction samples for the first block.

17. The method of claim 15, wherein the motion vector refinement is an optical flow based motion vector refinement.

18. A computing system, comprising:

control circuitry;

memory; and one or more sets of instructions stored in the memory and configured for execution by the control circuitry, the one or more sets of instructions comprising instructions for:

receiving video data comprising a plurality of blocks including a first block, wherein the first block is to be encoded using a combined intra inter prediction (CIIP) mode;

identifying an intra prediction mode for the first block;

identifying an inter prediction mode for the first block, the identified inter prediction mode being one of:

a geometric partition-based inter prediction mode, an affine motion based inter prediction mode, and a temporal interpolation prediction mode; and encoding the first block using the identified intra prediction mode and the identified inter prediction mode, wherein the inter prediction mode for the first block is selected from a group comprising the geometric partition-based inter prediction mode, the affine motion based inter prediction mode, and the temporal interpolation prediction mode when the identified intra prediction mode is one of a predefined set of intra prediction modes.

19. A non-transitory computer-readable storage medium storing a video encoding method, the video encoding method comprising:

receiving video data comprising a plurality of blocks including a first block, wherein the first block is to be encoded using a combined intra inter prediction (CIIP) mode;

identifying an intra prediction mode for the first block;

identifying an inter prediction mode for the first block, the identified inter prediction mode being one of:

a geometric partition-based inter prediction mode, an affine motion based inter prediction mode, and a temporal interpolation prediction mode; and encoding the first block using the identified intra prediction mode and the identified inter prediction mode, wherein the video bitstream comprises a signaled element indicating that the first block is to be encoded using a combined intra inter prediction (CIIP) mode such that the inter prediction mode for the first block is selected from a group comprising the geometric partition-based inter prediction mode, the affine motion-based inter prediction mode, and the temporal interpolation prediction mode when the identified intra prediction mode is one of a predefined set of intra prediction modes.

* * * * *